US012233536B2

(12) United States Patent
Cotroneo et al.

(10) Patent No.: US 12,233,536 B2
(45) Date of Patent: Feb. 25, 2025

(54) DIGITAL FINGER

(71) Applicant: WHIRLPOOL CORPORATION, Benton Harbor, MI (US)

(72) Inventors: Francesco Cotroneo, Virle Piemonte (IT); Lorenzo Fagnani, Arluno (IT)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 208 days.

(21) Appl. No.: 18/049,006

(22) Filed: Oct. 24, 2022

(65) Prior Publication Data

US 2024/0131726 A1 Apr. 25, 2024
US 2024/0227204 A9 Jul. 11, 2024

(51) Int. Cl.
*B25J 15/00* (2006.01)
*G06F 3/041* (2006.01)

(52) U.S. Cl.
CPC ........ *B25J 15/0009* (2013.01); *G06F 3/0412* (2013.01)

(58) Field of Classification Search
CPC .... B25J 15/0009; G06F 3/0412; G06F 3/044; G06F 11/2221; G06F 3/04886; G06F 3/0488; G06F 3/041; G06F 2203/04104; G06F 3/04186; H04L 43/50; G01R 31/3274
See application file for complete search history.

(56) References Cited

U.S. PATENT DOCUMENTS

| 8,521,439 | B2 | 8/2013 | Mott et al. |
| 8,996,166 | B2 | 3/2015 | Jenkinson |
| 9,962,838 | B2 | 5/2018 | Seong |
| 2013/0197862 | A1* | 8/2013 | Uzelac ................. G06F 3/0418 702/186 |
| 2013/0345864 | A1* | 12/2013 | Park ...................... B25J 9/0084 901/44 |
| 2014/0278187 | A1* | 9/2014 | Rovito .................... G06F 3/044 324/750.02 |
| 2018/0141214 | A1* | 5/2018 | Johnson ................. B25J 9/1679 |
| 2021/0278291 | A1 | 9/2021 | Huang et al. |
| 2021/0293648 | A1 | 9/2021 | Tu et al. |

FOREIGN PATENT DOCUMENTS

WO WO-2016131876 A1 * 8/2016 .......... G06F 11/2221

* cited by examiner

*Primary Examiner* — Abby Y Lin
*Assistant Examiner* — Dylan M Katz
(74) *Attorney, Agent, or Firm* — BROOKS KUSHMAN P.C.

(57) ABSTRACT

A digital finger for testing a touchscreen of an appliance using a testing robot is provided. A control circuit receives, from a load cell, first signals indicative of pressure applied by a finger holder simulating interaction with the touchscreen, the load cell being held by a load cell housing defining a channel for receiving the finger holder, such that when the finger holder is pressed onto the touchscreen, the finger holder moves to increase pressure against the load cell. The control circuit receives, from the appliance, second signals indicative of recognition of a touch to the touchscreen. The control circuit determines, response time of the touchscreen and/or the pressure required to operate the touchscreen based on the first and second signals.

33 Claims, 13 Drawing Sheets

DIGITAL FINGER

TECHNICAL FIELD

Aspects of the disclosure generally relate to automated testing of touch features, such as touchscreen control panels.

BACKGROUND

A resistive touch screen may be constructed of layers of flexible plastic and glass coated with conductive material. When a user applies pressure to the screen, resistance between the layers changes. This can be used to identify where the user pressed. Instead of a difference in resistance, a capacitive touch screen uses a conductive touch of a human finger (or a specialized device) as input. When a capacitive touch screen is touched by the user, a small electrical charge is drawn to the point of contact. This allows the display to detect where it has received an input. The result is a display that can detect lighter touches and with greater accuracy than a resistive touchscreen.

SUMMARY

In one or more embodiments, a digital finger for testing a touchscreen of an appliance using a testing robot is provided. A finger holder is configured to simulate interaction with the touchscreen. A load cell housing is configured to hold a load cell. The load cell housing defines a channel for receiving the finger holder, such that when the finger holder is pressed onto the touchscreen, the finger holder moves to increase pressure against the load cell. A control circuit is configured to receive, from the load cell, first signals indicative of the pressure applied by the finger holder to the load cell. The control circuit is also configured to receive, from the appliance, second signals indicative of recognition of a touch to the touchscreen. The control circuit determines response time of the touchscreen and/or the pressure required to operate the touchscreen based on the first and second signals.

In one or more embodiments, the control circuit is further configured to determine the response time as a difference in time between receipt of the first signals and receipt of the second signals.

In one or more embodiments, the control circuit is further configured to determine the pressure required to operate the touchscreen as being the pressure recorded by the load cell at the time of receipt of the second signals.

In one or more embodiments, the digital finger is attached as an end effector of an arm of the testing robot.

In one or more embodiments, the control circuit includes one or more switches configured to allow for selection of parameters to interface the digital finger to a device under test.

In one or more embodiments, the control circuit includes one or more switches configured to allow for selection between a first mode of operation in which the response time of the touchscreen is measured, and a second mode of operation in which the pressure required to operate the touchscreen is measured by the digital finger.

In one or more embodiments, the digital finger is attached as an end effector of an arm of the testing robot.

In one or more embodiments, the control circuit is further configured to command the arm to move towards the touchscreen to apply the pressure to the touchscreen by the digital finger.

In one or more embodiments, the load cell housing comprises an L-shaped connector having first and second legs serving as attachment points for insertion of the load cell housing into the testing robot as the end effector, the L-shaped connector being insertable into the testing robot in a first position where the finger holder is parallel to the end of the testing robot, and a second position where the finger holder is perpendicular to the testing robot.

In one or more embodiments, the load cell housing defines two parallel spaced apart C-shaped legs that collectively define the channel configured for receiving the finger holder, and the finger holder defines slide portions extending laterally from opposite sides of the finger holder, the slide portions being sized in accordance with an inner profile of the channel such that the finger holder is free to slide inwards and outwards within the channel.

In one or more embodiments, the digital finger includes one or more biasing members fitted within the channel between one or both of the slide portions and a back surface of the channel, the one or more biasing members configured to bias the finger holder outwards and away from the load cell.

In one or more embodiments, the digital finger includes adjustment screws to adjust an initial linear location of the finger holder to press onto the load cell in an initial state, wherein the control circuit is configured to detect an unpressed pressure value when the finger holder is pressing the load cell in the initial state, and use the unpressed pressure value as a zero point to indicate that no force is being applied to the touchscreen.

In one or more embodiments, the load cell housing includes a magnet configured to hold the load cell in position within the channel.

In one or more embodiments, the digital finger includes a display to show the response time of the touchscreen and/or the pressure required to operate the touchscreen.

In one or more embodiments, a method for using a digital finger for testing a touchscreen of an appliance using a testing robot is provided. A control circuit receives, from a load cell, first signals indicative of pressure applied by a finger holder simulating interaction with the touchscreen, the load cell being held by a load cell housing defining a channel for receiving the finger holder, such that when the finger holder is pressed onto the touchscreen, the finger holder moves inwards and increases the pressure against the load cell. The control circuit receives, from the appliance, second signals indicative of recognition of a touch to the touchscreen. The control circuit determines, response time of the touchscreen and/or the pressure required to operate the touchscreen based on the first and second signals.

In one or more embodiments, the method includes the control circuit determining the response time as a difference in time between receipt of the first signals and receipt of the second signals.

In one or more embodiments, the method includes the control circuit determining the pressure required to operate the touchscreen as being the pressure recorded by the load cell at the time of receipt of the second signals.

In one or more embodiments, the method includes the control circuit operating in a first mode of operation in which the response time of the touchscreen is measured responsive to one or more switches of the control circuit being in a first position, and the control circuit operating in a second mode of operation in which the pressure required to operate the touchscreen is measured by the digital finger responsive to the one or more switches of the control circuit being in a second position.

In one or more embodiments, the digital finger is attached as an end effector of an arm of the testing robot, and the method includes commanding the arm by the control circuit to move towards the touchscreen to apply the pressure to the touchscreen by the digital finger.

In one or more embodiments, the method includes adjusting screws to adjust an initial linear location of the finger holder to press onto the load cell in an initial state; detecting, by the control circuit, an unpressed pressure value when the finger holder is pressing the load cell in the initial state; and using the unpressed pressure value as a zero point to indicate that no force is being applied to the touchscreen.

In one or more embodiments, the method includes showing, on a display screen of the control circuit, the response time of the touchscreen and/or the pressure required to operate the touchscreen.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

To validate capacitive touchscreens used by appliances and other devices, the pressing force on the touchscreen may be measured. This measurement may be used to ensure that software calibration values for detecting touch input are correct. Calibration values that are too low may cause the appliance to suffer false positives when the touchscreen is not pressed, while values that are too high may require excessive force by the user or may cause the touchscreen to fail to register valid input. It may similarly be desirable to measure the timing of the touchscreen from the moment a key is pressed to the moment the microcontroller notices the touchscreen is pressed. Aspects of the disclosure generally relate to apparatus for testing the operation of touchscreens. Further aspects of the disclosure generally relate to methods of utilizing the testing hardware to validate the performance of the touchscreens.

Figure 1A:
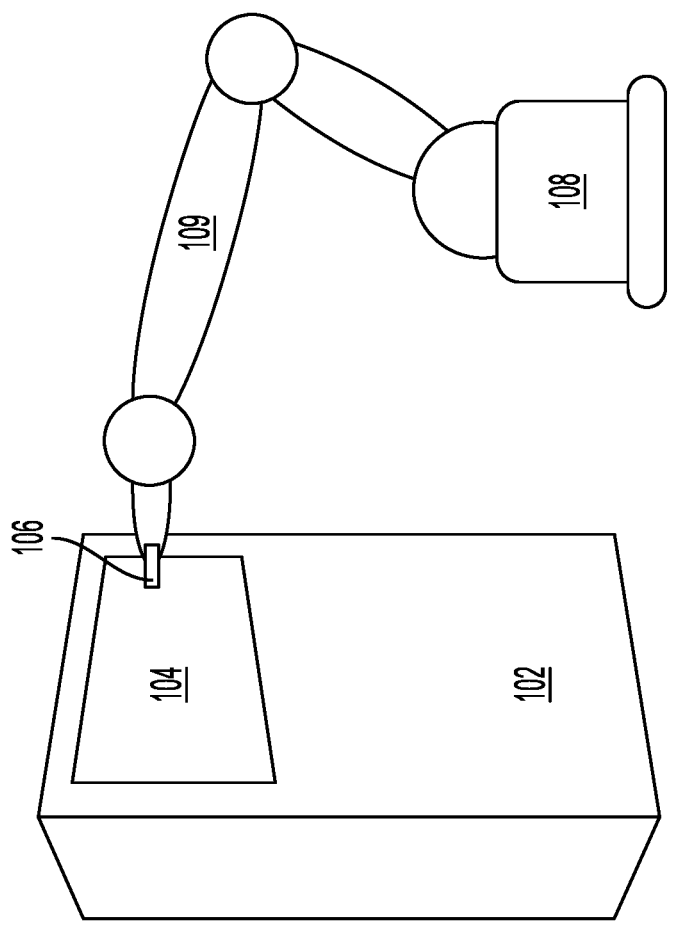
FIG. 1A illustrates an example testing environment for a touchscreen of an appliance.
Figure 1B:
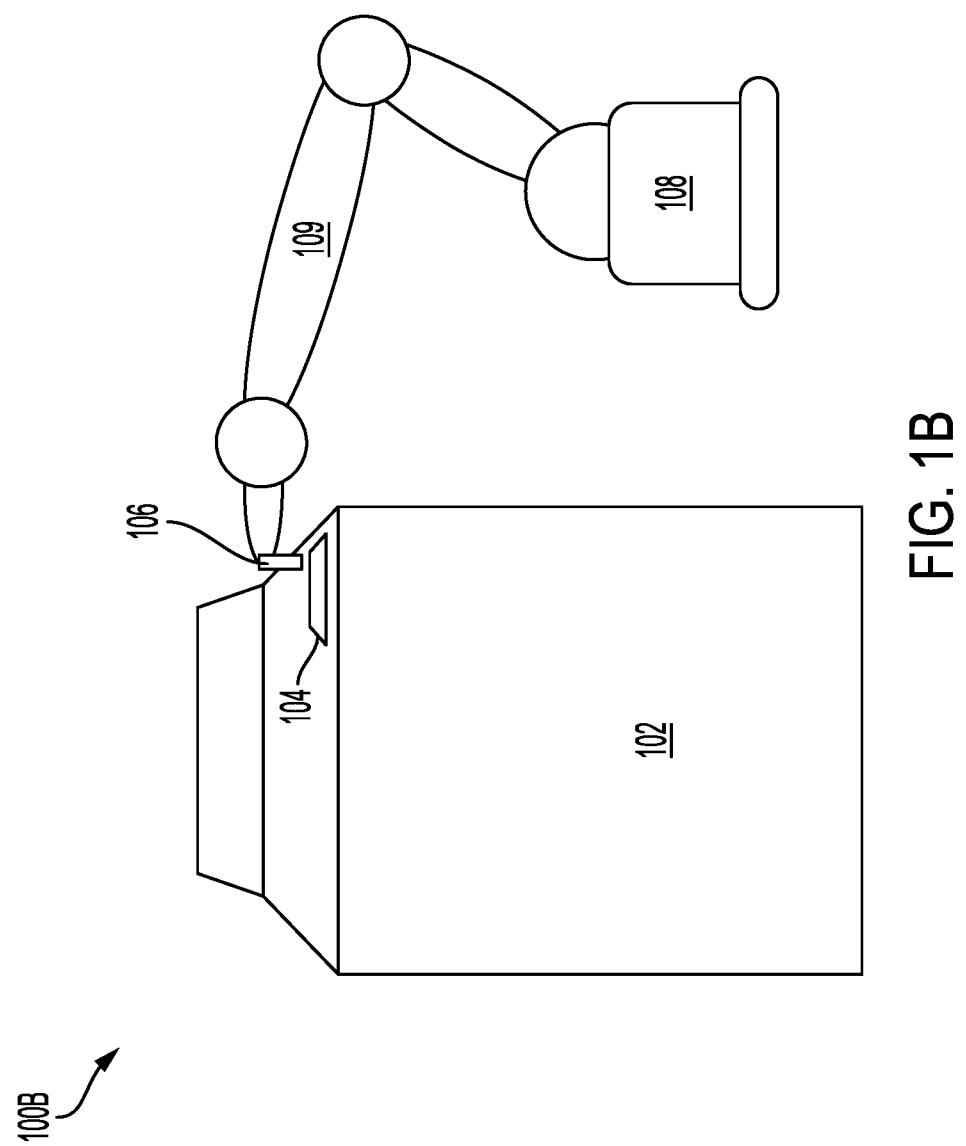
FIG. 1B illustrates an alternate example testing environment for a touchscreen of an appliance.
Figure 2:
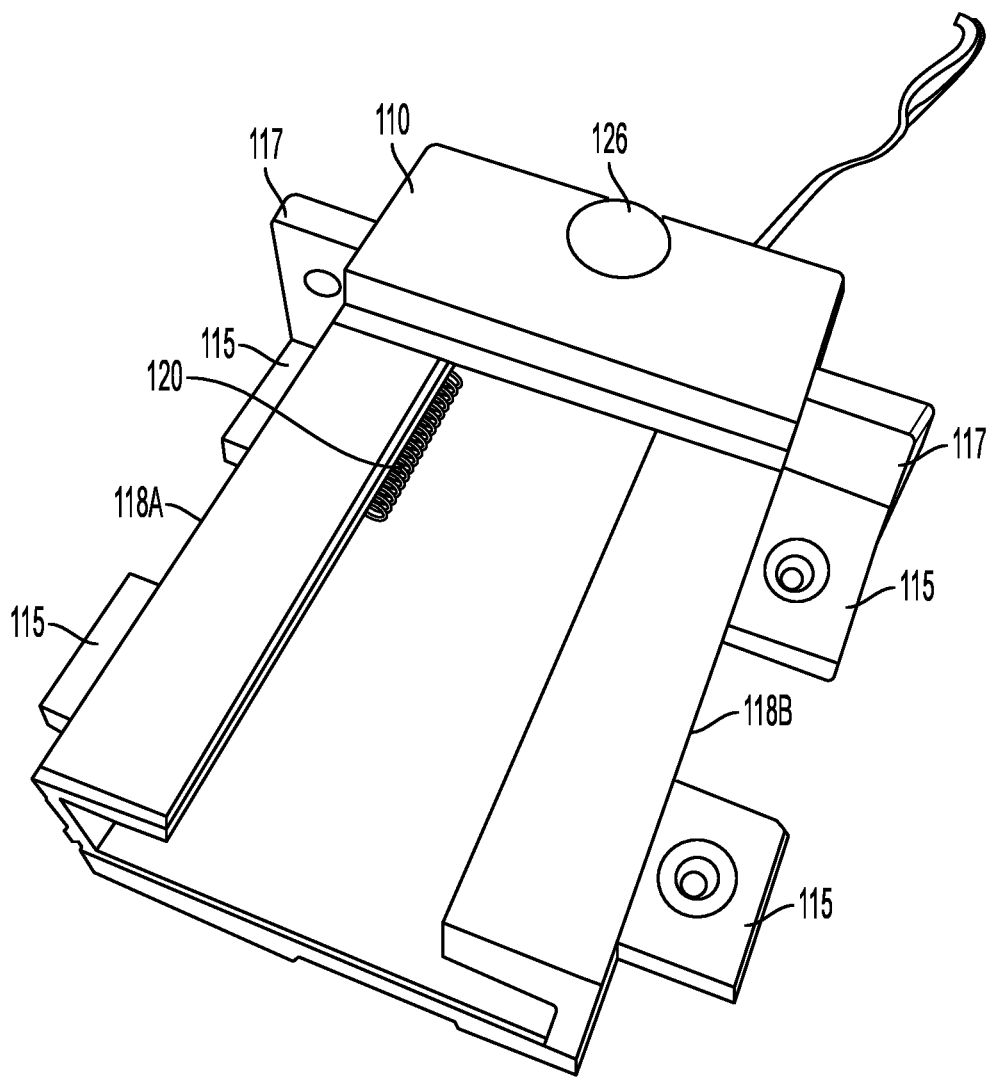
FIG. 2 illustrates a perspective view of a load cell housing of the digital finger.

FIG. 1A illustrates an example testing environment 100A for an appliance 102 having a front-facing touchscreen 104. FIG. 1B illustrates an example testing environment 100B for an alternate appliance 102 having a top-facing touchscreen 104.

Touchscreens 104 are commonly used in various types of appliances 102, such as dishwashers, ovens, microwaves, cooktops, washing machines, dryers, refrigerators, mixers, toasters, etc. In some appliances 102, touchscreens 104 are the main mechanism for receiving user input. Accordingly, it is imperative that the touchscreen 104 perform within defined parameters. For instance, it may be desirable to measure the pressing force required to actuate the touchscreen 104. This may be done to verify that the minimum touch threshold values entered in the software of the appliance 102 are correct. It may also be desirable to measure the timing from the moment a touch input is provided to the moment the appliance 102 identifies that the input was provided. This may be used to ensure that the response time of the touchscreen 104 is within acceptable limits.

A calibration may be performed on the touchscreen 104 to ensure that the touchscreen 104 is performing adequately for the appliance 102. To perform the calibration, a digital finger 106 tool may be provided. The digital finger 106 may be configured to measure minimum pressure to recognize a touch to the touchscreen 104 and/or response time from the moment the digital finger 106 presses a key of the touchscreen 104 until the touchscreen 104 recognizes the input.

The digital finger 106 may be manipulated, e.g., via a testing robot 108, to verify and validate various types of capacitive touches performed to the touchscreen 104. For instance, an arm 109 of the testing robot 108 may be moved closer to the touchscreen 104 to simulate a press of the touchscreen 104, and the arm 109 of the testing robot 108 may be away from the touchscreen 104 to simulate a discontinuation of a press of the touchscreen 104. In another example, a movement of the arm 109 of the testing robot 108 may be performed to move the relative location of the digital finger 106 with respect to the touchscreen 104. This change in position may allow the testing robot 108 to change the portion of the touchscreen 104 to be tested using the digital finger 106.

The testing robot 108 may be of various designs. In an example, the testing robot 108 may be a multiple axis robot arm 109. In such an example, the digital finger 106 may be used as the end effector of the arm 109 of the testing robot 108. One non-limiting implementation of a testing robot 108 is the Niryo One 6-axis collaborative robot.

Figure 3:
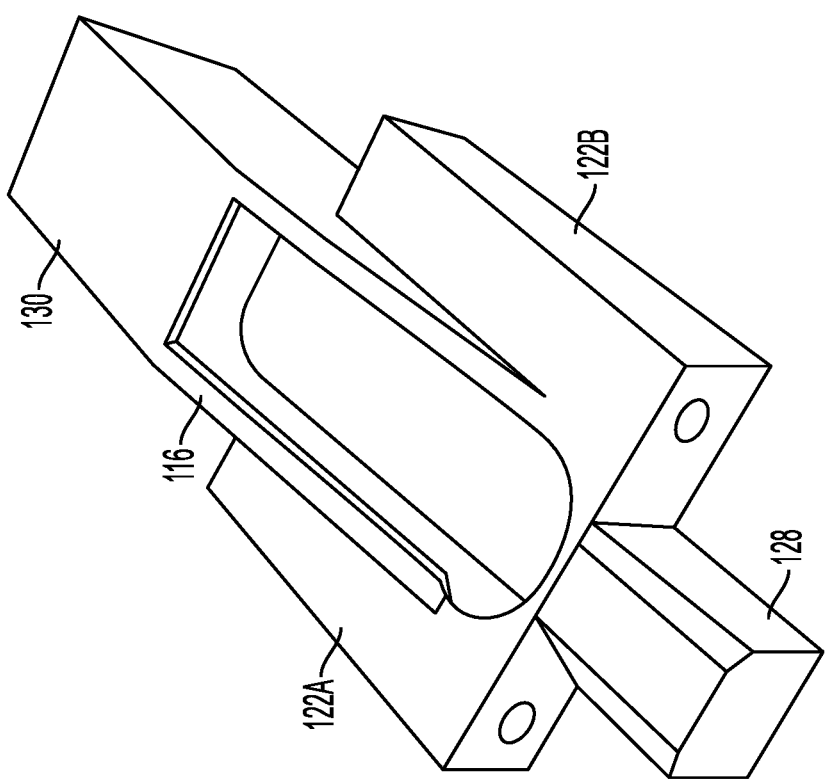
FIG. 3 illustrates a perspective view of a finger holder configured to fit into the load cell housing of the digital finger.
Figure 4:
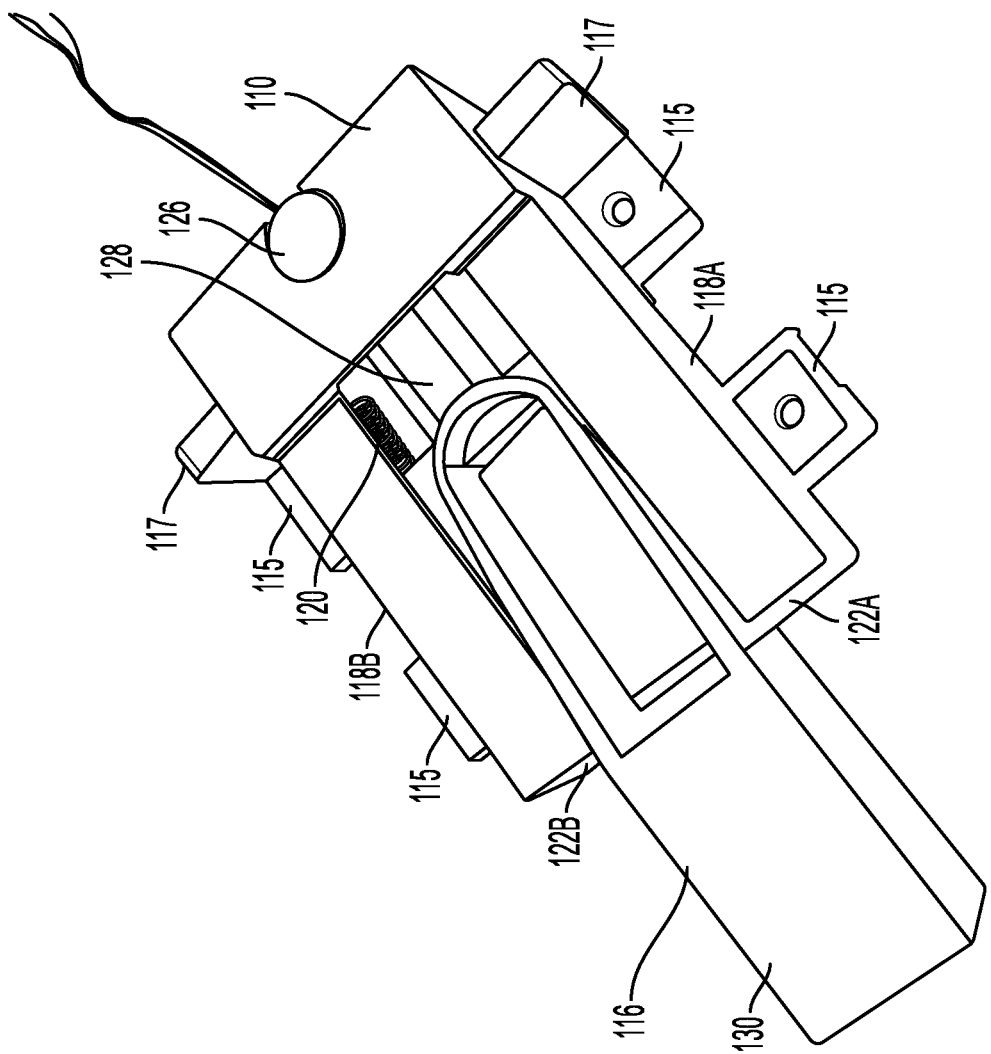
FIG. 4 illustrates a perspective view of the finger holder assembled into the load cell housing of the digital finger.

FIGS. 2-9 illustrate details of the construction of the digital finger 106. In general, the digital finger 106 may include a finger holder 116 configured to hold a stylus tip 132 for simulating human interaction with the touchscreen 104. The finger holder 116 is shown alone in FIG. 3. The digital finger 106 may further include a load cell housing 110 configured to hold a load cell 124 for measuring the pressing force. The load cell housing 110 is shown alone in FIG. 2. The finger holder 116 may be assembled into the load cell housing 110 and may operate as a slide such that, when stylus tips 132 is pressed onto the touchscreen 104, the finger holder 116 moves inwards and increases pressure against the load cell 124. The load cell housing 110 with the finger holder 116 inserted is shown in FIG. 4.

The load cell housing 110 may define control box flanges 115 for holding a control box 135. The control box flanges 115 may extend outward from the sides of the body of the load cell housing 110 and may be configured to receive fasteners to which the control box 135 may be affixed. In an example, the control box flanges 115 may define threaded apertures into which screws may be driven to hold the control box 135. The control box 135 is shown assembled to the load cell housing 110 in FIGS. 6-8.

The load cell housing 110 may also define connector control flanges 117. The connector control flanges 117 may extend from the end of the load cell housing 110 opposite the finger holder 116 and may serve to hold a connector block 137 facilitating attachment of the digital finger 106 to the testing robot 108.

Figure 8:
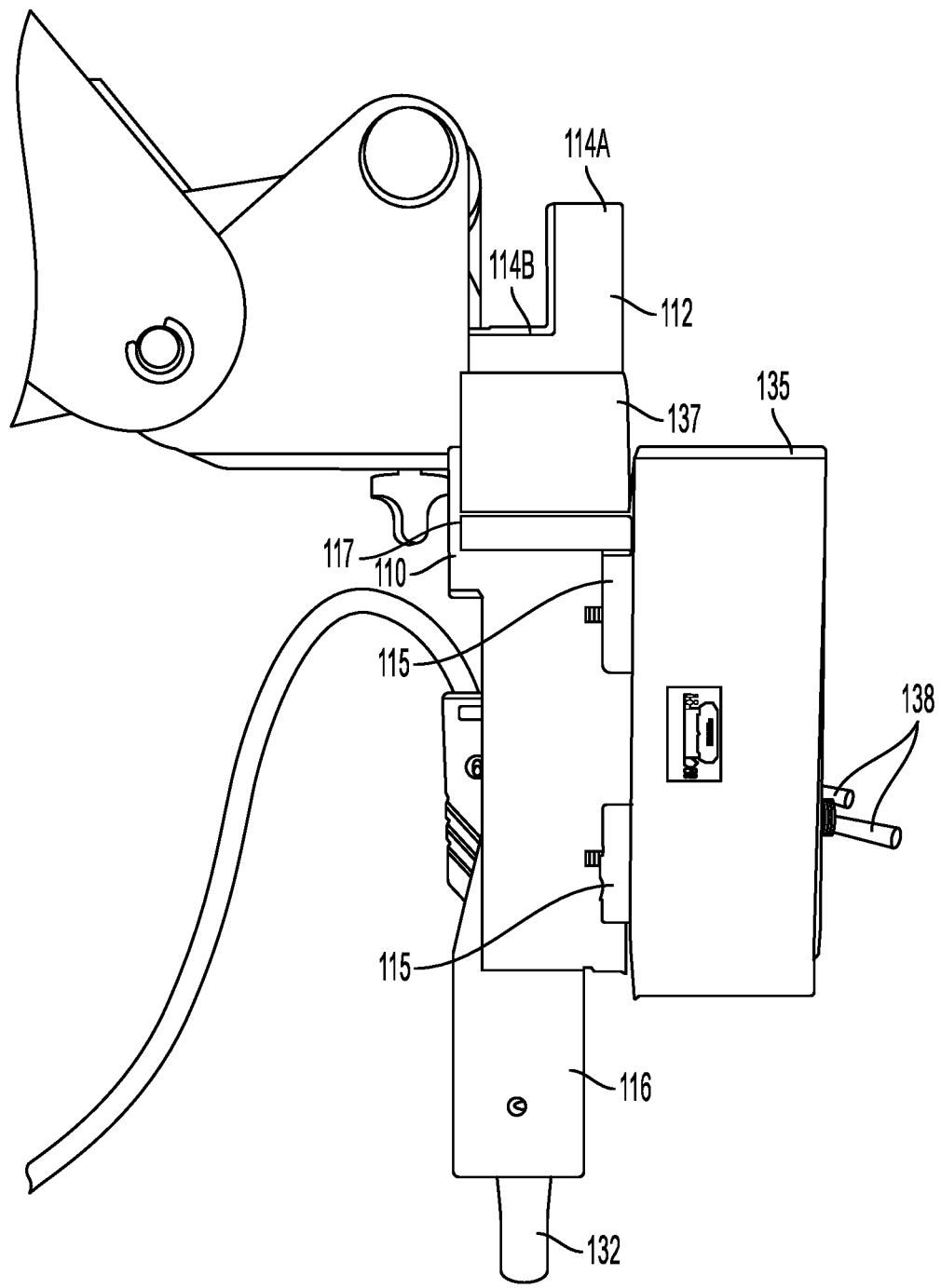
FIG. 8 illustrates a left side view of the digital finger as assembled to the testing robot.
Figure 9:
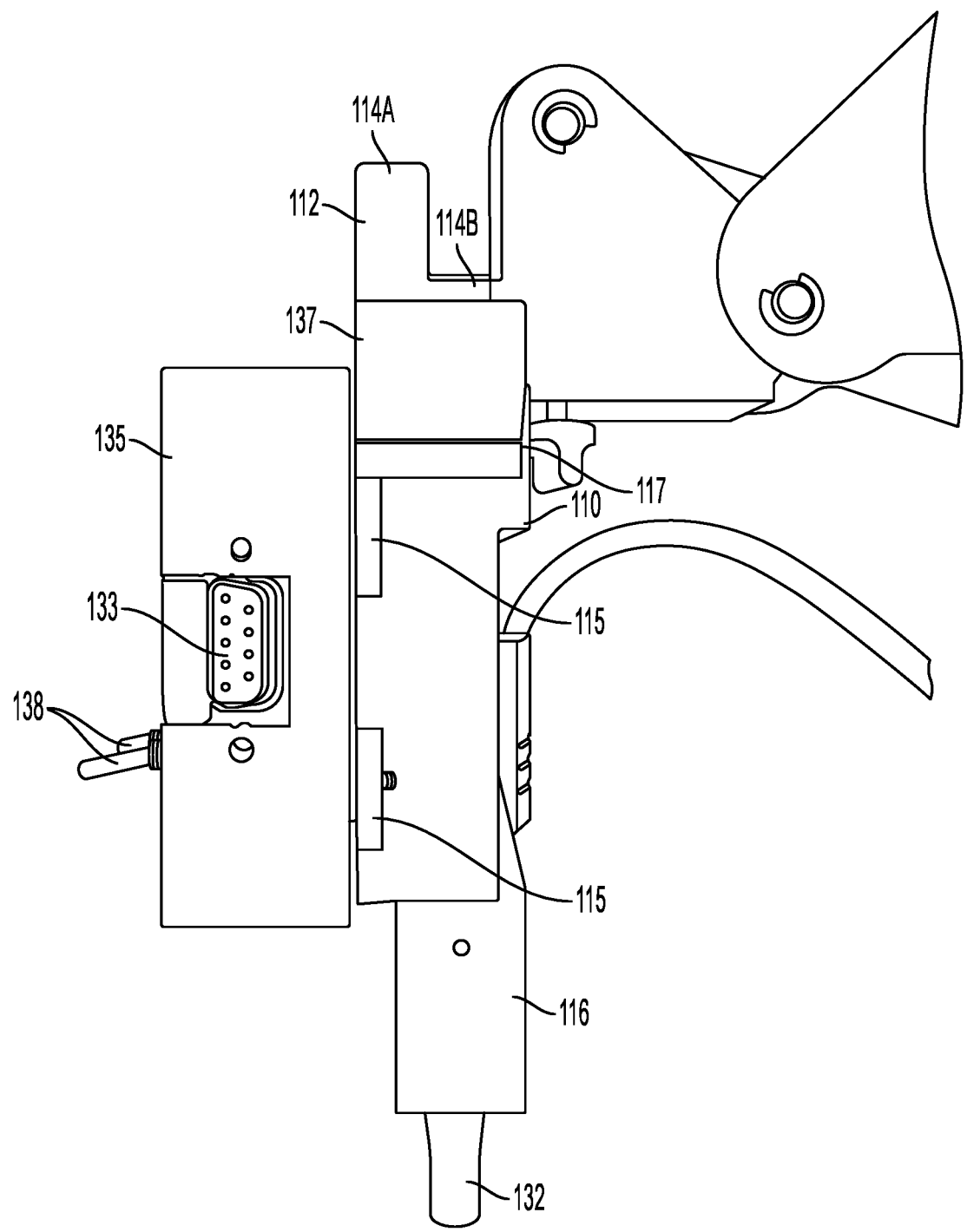
FIG. 9 illustrates a right side view of the digital finger as assembled to the testing robot.

As best seen in FIGS. 8-9, the connector block 137 provides for attachment of the digital finger 106 to the testing robot 108. To do so, the connector block 137 includes a generally rectangular body that defines an L-shaped connector 112 on the free side of the connector block 137 away from the connector control flanges 117. The L-shaped connector 112 may define a pair of legs 114 individually labeled as first leg 114A and second leg 114B. The first leg 114A may extend outward from an end portion of the connector block 137 parallel with the body of the load cell housing 110, while the second leg 114B may extend upward from the load cell housing 110 perpendicular to the first leg 114A.

Figure 7:
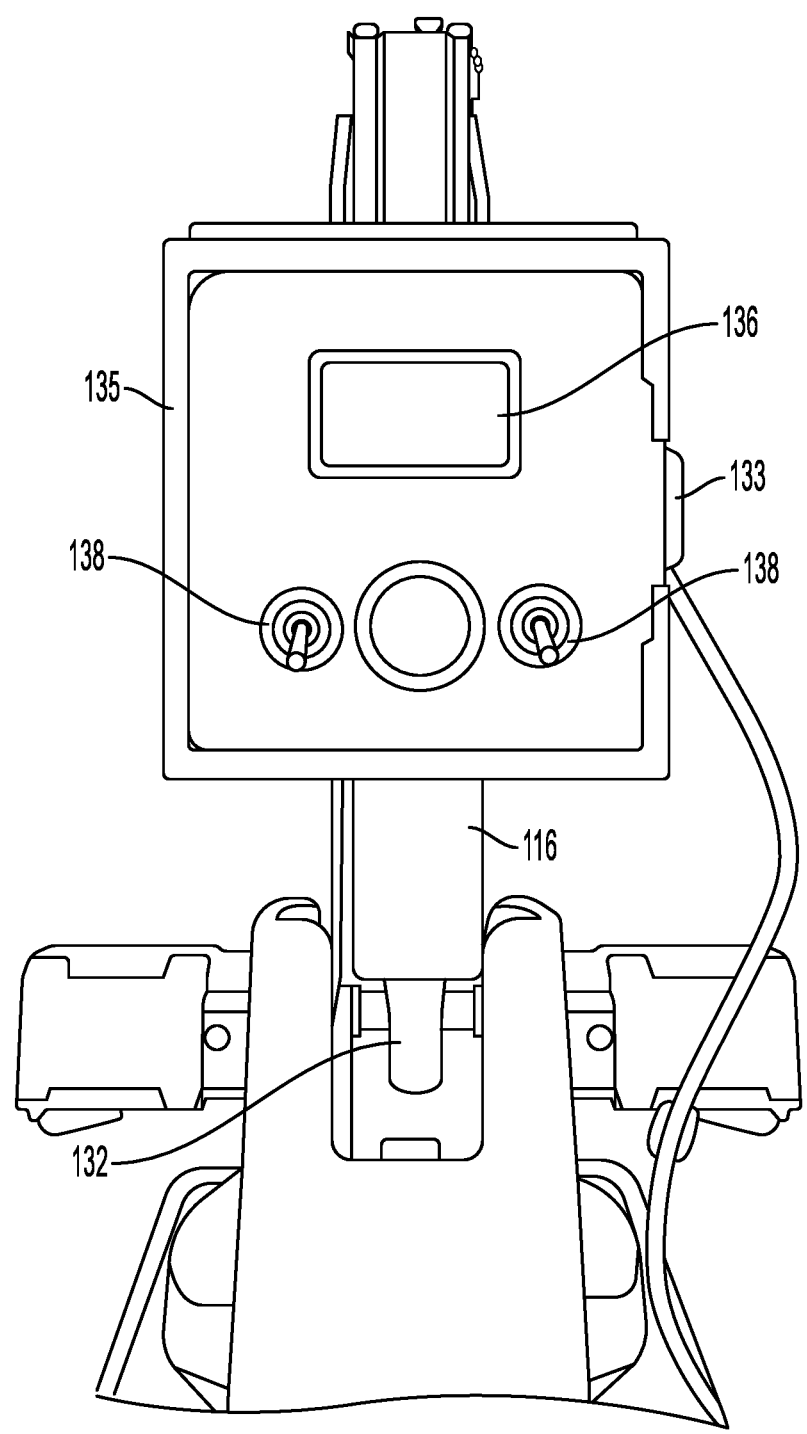
FIG. 7 illustrates a front view of the digital finger as assembled to the testing robot.

The L-shaped connector 112 may be insertable into testing robot 108 in two positions: a first position where the finger holder 116 is parallel to the end of the testing robot 108, and a second position where the finger holder 116 is perpendicular to the testing robot 108. The first and second legs 114A, 114B may thus serve as these attachment points for insertion of the load cell housing 110 into the testing robot 108. In an example, the first leg 114A may be inserted into the testing robot 108 when the touchscreen 104 is located on the front face on the appliance 102 as shown in FIG. 1A. The second leg 114B may be inserted into the testing robot 108 when the touchscreen 104 is located on the top face on the appliance 102 as shown in FIG. 1B. By using L-shaped connector 112, the same load cell housing 110 may be used to test touchscreens 104 on the front panel of the appliance 102 and touchscreens 104 on the top panel of the appliance 102. As shown in FIGS. 7-9, the second leg 114B is being used for attachment of the digital finger 106 to the testing robot 108.

It should be noted that the L-shaped connector 112 is only one example of a connector, and other types of connector may be attached via the connector block 137 to facilitate use of the digital finger 106 with other configurations of testing robots 108. For instance, another connector may provide for an attachment point at a different angle. Or, another connector may provide for attachment to a different style of robot arm 109. Thus, any testing robot 108 can be interfaced with the digital finger 106 tool by creating the appropriate adapter.

Returning to FIG. 2, the load cell housing 110 may provide support for the finger holder 116. To do so, the load cell housing 110 may define two parallel spaced apart C-shaped legs 118A, 118B at the second end opposite the L-shaped connector 112. The two parallel C-shaped legs 118A, 118B may collectively define a generally rectangular channel configured for receiving the finger holder 116.

As best shown in FIG. 3, the finger holder 116 body may define slide portions 122A, 122B (collectively slide portions 122) that extend laterally from opposite sides of the finger holder 116. The slide portions 122A, 122B may be sized in accordance with the inner profile of the channel between the legs 118A, 118B. When the finger holder 116 is inserted into the load cell housing 110, the slide portions 122A, 122B of the finger holder 116 may be free to slide inwards and outwards within the channel formed by the legs 118A, 118B.

As best seen in FIG. 4, one or more biasing members 120, such as springs, may be fitted within the channel, between one or both of the slide portions 122 and the inner end of the channel. The biasing member 120 may serve to bias the finger holder 116 outwards and away from the first end of the load cell housing 110. Thus, the biasing members 120 may be operational to help the digital finger 106 return to an unpressed position after a key of the touchscreen 104 has been pressed.

The outer portion of the finger holder 116 may define a test finger end portion 130 to which a stylus tip 132 may be attached. As shown in FIGS. 7-9, the stylus tip 132 may include a nub of a rubber or other material configured to simulate the touch of a human finger when pressed against the touchscreen 104.

Figure 5:
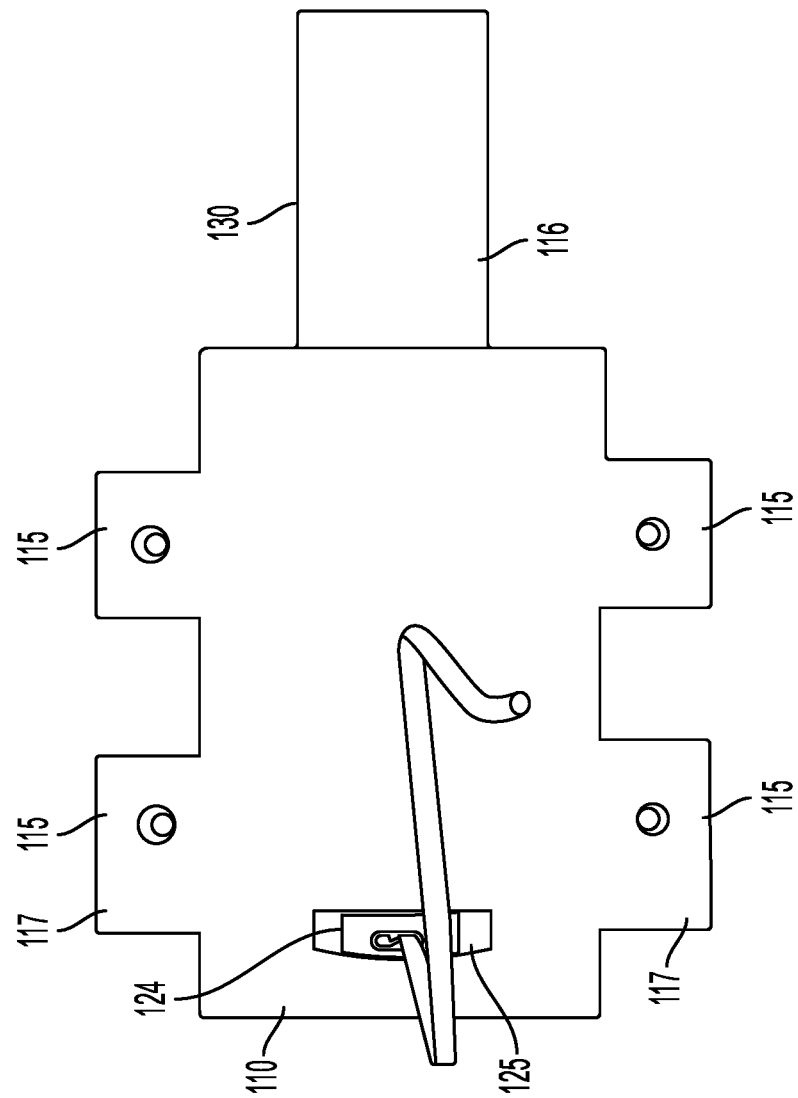
FIG. 5 illustrates a bottom view of the digital finger showing the placement of the electronics board and load cell.

As best seen in FIG. 5, a load sensor or load cell 124 may be held in place in the inner end portion of the channel. The load cell 124 may be any of various electronic devices that convert tension or compression forces into a corresponding electrical signal. The load cell 124 may be insertable into an aperture 125 sized to allow for the load cell 124 to be placed into the load cell housing 110 in a position to measure the force applied by the finger holder 116. In an example, the load cell 124 may have a magnetic metallic body and may be held into the load cell housing 110 by a magnet 126. By using a magnet 126 for attachment, the design of the load cell housing 110 may be simplified to avoid more complex attachment mechanisms for the load cell 124 apart from the aperture 125 and magnet 126.

The inner end portion of the finger holder 116 may define a push rod 128 that is configured to come into contact with the load cell 124 when the finger holder 116 slides inwards towards the load cell housing 110. When the arm 109 of the testing robot 108 is used to advance the digital finger 106 towards the touchscreen 104, the stylus tip 132 of the finger holder 116 may press against the touchscreen 104, causing the finger holder 116 to linearly slide inwards against the biasing members 120, in turn causing the push rod 128 to impart increasing force into the load cell 124. This increase in force may accordingly be measured by the load cell 124.

Figure 6:
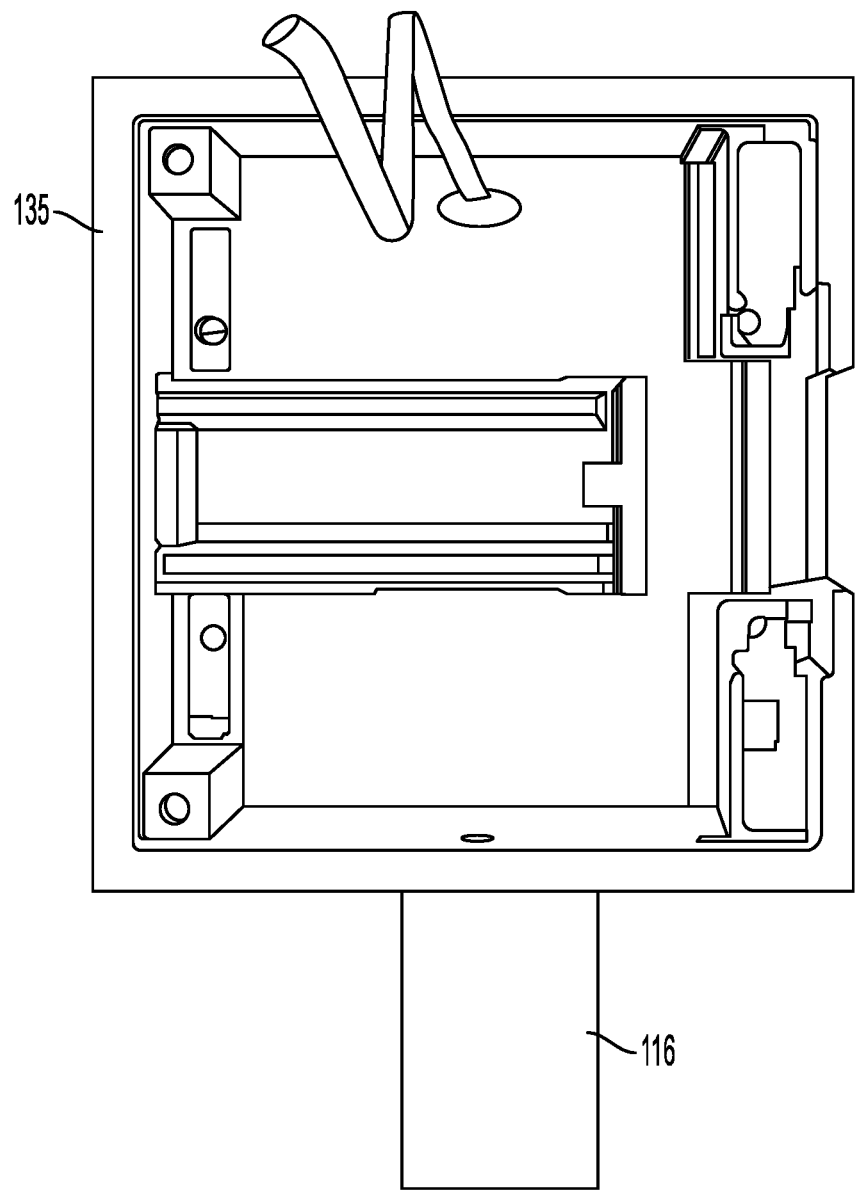
FIG. 6 illustrates a front view of the digital finger showing the interior of the control box.

The digital finger 106 may further include a control circuit 134. The control circuit 134 may be generally included in the control box 135 as shown in FIGS. 6-9. As shown in FIG. 6, the control circuit 134 that manages the signals may be inserted within the cavity defined by the control box 135. The control box 135 may generally be sized to hold the control circuit 134, as well as to provide support for controls such as a display 136 and switches 138 on its front face. The control circuit 134 may include a processor, such as an Arduino or a Raspberry Pi, or the like. Using the processor, the control circuit 134 may be programmed or otherwise configured to perform the process operations described in detail herein. For instance, the control circuit 134 may be configured to receive signals from the load cell 124 and perform various functions based on those signals. In an example, the control circuit 134 may be configured to print the pressure values indicated by the signals from the load cell 124 on the display 136. In another example, the control circuit 134 may be configured to record the timing of the pressure values indicated by the load cell 124.

The control circuit 134 may be further configured to instruct the testing robot 108 to perform various operations in support of the touchscreen 104 testing. For instance, the control circuit 134 may be in electrical communication with a control interface of the testing robots 108 to allow the control circuit 134 to send commands to the testing robot 108. In an example the control circuit 134 may expose a port 133 to which the control circuit 134 may communicate with the testing robot 108. The port 133 may be accessible via a side of the control box 135, in an example. Also, the control circuit 134 may be in such electrical communication to receive sensing outputs from the testing robot 108. In some examples, the control circuit 134 may utilize the robot operating system (ROS) robotics middleware software framework to provide the digital finger 106 with software control for the motor and sensing functionality of the testing robot 108.

In addition, the control circuit 134 may be configured to interface with signals from the appliance 102 under test. For instance, the control circuit 134 may receive signals from the appliance 102 indicative of the recognition, by the appliance 102, of presses of the touchscreen 104. In an example, the appliance 102 may have a diagnostic port (not shown) or their interface to which the control circuit 134 may be electrically connected, e.g., to the port 133, to receive signals indicative of presses of the touchscreen 104.

As noted herein, the control circuit 134 may be configured to measure various aspects of the operation of the touchscreen 104. In an example, the control circuit 134 may be configured to measure the pressing force required to actuate the touchscreen 104 (as explained in detail in FIG. 10). In another example, the control circuits 134 may be configured to measure the timing from the moment a touch input is provided to the moment the appliance 102 identifies that the input was provided (as explained in detail in FIG. 11). The control circuit 134 may include one or more switches 138 configured to adjust the operating mode of the control circuit 134. For instance, the one or more switches 138 may be set to a first position to measure minimum touch threshold, and may be set to a second position to measure response time.

During a response time test, to minimize the dead times of the digital finger 106, the digital finger 106 may provide adjustment screws (not shown) to adjust the initial linear location of the finger holder 116 to initially press onto the load cell 124. The software of the control circuit 134 may detect that the finger holder 116 is pressing the load cell 124 in this initial state, and may use this unpressed pressure value as a zero point to indicate that no force is being applied to the touchscreen 104. When the key is pressed, there will be a change in the reported pressure of the load cell 124 which indicates that the touchscreen 104 was pressed. The difference between the pressing load and the load designated as the zero point may be utilized as the measure of force required to press the touchscreen 104. The digital finger 106 may also read signals from the appliance 102 to determine when the appliance 102 understands that a key has been pressed.

Figure 10:
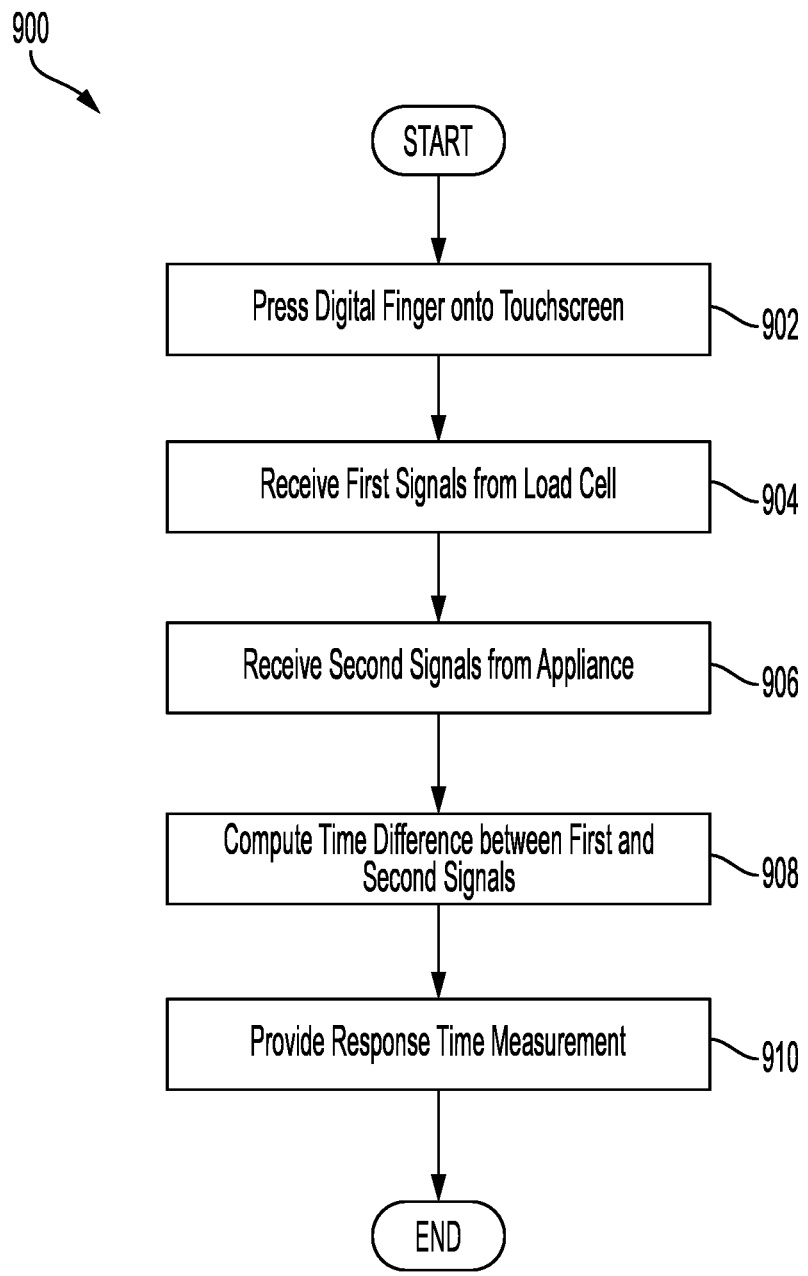
FIG. 10 illustrates an example testing method for determining response time of the touchscreen.

FIG. 10 illustrates an example testing method 900 for determining response time of the touchscreen 104. In an example, the method 900 may be performed via operation of the digital finger 106 installed to the testing robot 108. By combining the information from the appliance 102 and from the digital finger 106, the control circuit 134 may be configured to determine response time of the touchscreen 104.

At operation 902, the testing robot 108 presses the digital finger 106 onto the touchscreen 104 of the appliance 102. This may be performed, for example, responsive to commands sent by the control circuit 134 to the testing robot 108. These commands may be sent responsive to a user pressing a button on the control circuit 134. Or, these commands may be sent responsive to the control circuit 134 executing a testing program to control the operation of the testing robot 108. For instance, the testing robot 108 may be programmed to move the robot arm 109 towards the touchscreen 104 to apply pressure by the digital finger 106, and then move the robot arm 109 away from the touchscreen 104 to relieve the pressure from the touchscreen 104.

At operation 904, the control circuit 134 receives first signals from the load cell 124 indicative of increased pressure on the touchscreen 104. In an example, the control circuit 134 may monitor the pressure signals received from the load cell 124, and may identify in the pressure signals an increase in the level of pressure that is sensed by the load cell 124. This increase may be measured based on the zero point as indicated above.

At operation 906, control circuit 134 receives second signals from the appliance 102 indicative of registering a press of the touchscreen 104. In an example, the control circuit 134 may receive the second signals from the appliance 102, such as via connection of the port 133 to a diagnostic connector of the appliance 102.

At operation 908, the control circuit 134 computes a difference in time between the first and second signals. For instance, the control circuit 134 may subtract the time at which the second signals were received from the appliance 102 indicative of recognition of a press of the touch touchscreen 104 from the time at which the first signals from the load cell 124 indicate increased pressure to the touchscreen 104. This difference may indicate the response time of the touchscreen 104.

At operation 910, the control circuit 134 provides the response time for use. In an example, the control circuit 134 may show the response time on the display 136, such as numerically as a number of milliseconds. In another example, the control circuit 134 may provide the response time to a calibration program of the appliance 102, e.g., via a connection to the port 133 to a diagnostic connector of the appliance 102. In yet another example, the control circuit 134 may apply the response time to the software of the appliance 102 to calibrate the appliance 102. After operation 910, the method 900 ends.

Variations on the method 900 may be performed. In another example, the control circuit 134 may additionally or alternately determine the response time of the release of a control from the touchscreen 104. For instance, beginning from a condition where the digital finger 106 is pressing the touchscreen 104, the control circuit 134 may instruct the testing robot 108 to remove the digital finger 106 from the touchscreen 104. The control circuit 134 may then receive first signals from the load cell 124 indicative of decreased pressure on the touchscreen 104 and second signals from the appliance 102 indicative of removal of the press of the touchscreen 104. These signals may be subtracted to determine the release response time of the touchscreen 104, which may differ from the recognition response time. As another variation, the control circuit 134 may additionally or alternately perform such press and/or press release response tests on different areas of the touchscreen 104. This may allow the control circuit 134 to map differences in the responsiveness of different areas of the touchscreen 104.

Figure 11:
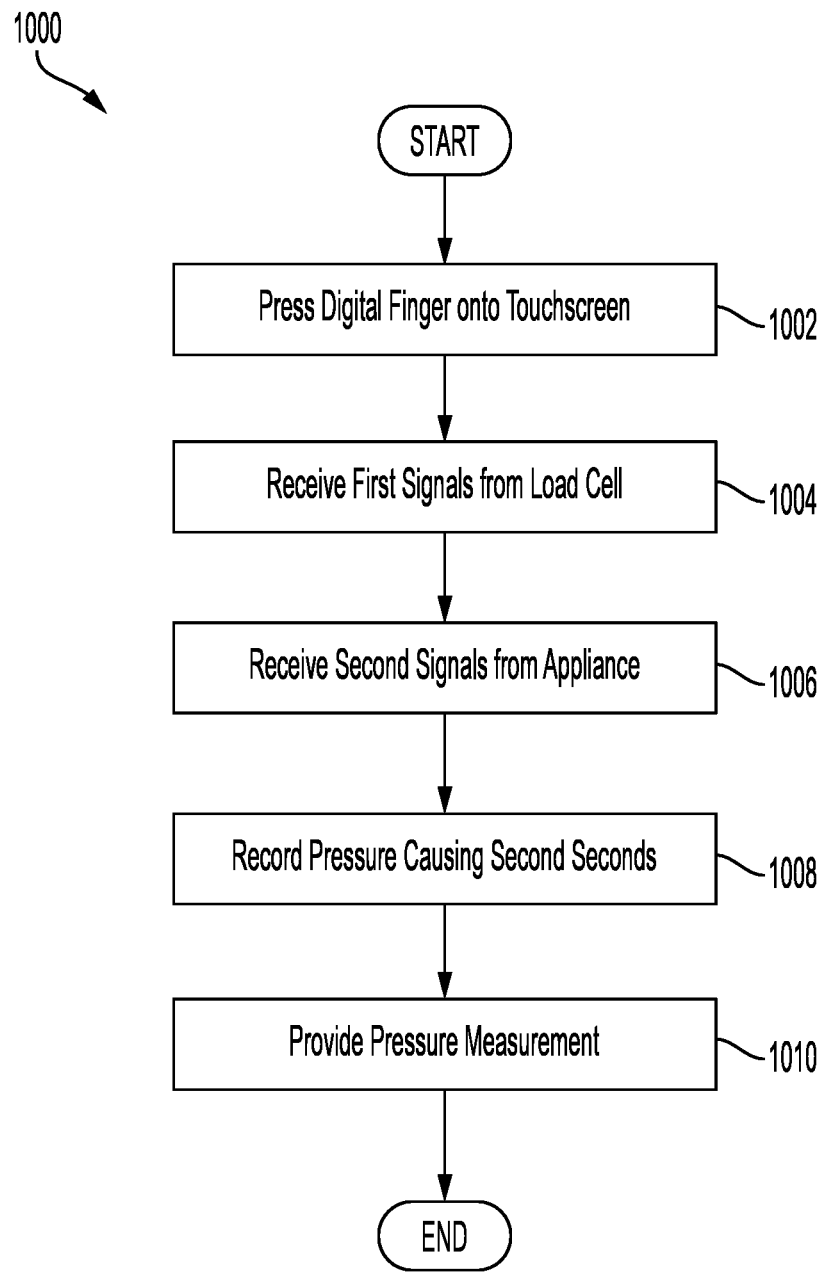
FIG. 11 illustrates an example testing method for determining a pressure threshold required to cause the touchscreen to register a touch input.

FIG. 11 illustrates an example testing method 1000 for determining a pressure threshold required to cause the touchscreen 104 to register a touch input. As with the method 900, the method 1000 may also be performed via operation of the digital finger 106 installed to the testing robot 108.

At operation 1002, the testing robot 108 presses the digital finger 106 onto the touchscreen 104 of the appliance 102. This may be performed, for example, responsive to commands sent by the control circuit 134 to the testing robot 108. These commands may be sent responsive to a user pressing a button on the control circuit 134. Or, these commands may be sent responsive to the control circuit 134 executing a testing program to control the operation of the testing robot 108. For instance, the testing robot 108 may be programmed to provide increasing pressure by the digital finger 106 onto the touchscreen 104 of the appliance 102.

At operation 1004, the control circuit 134 receives first signals from the load cell 124 indicative of the pressure on the touchscreen 104. In an example, the control circuit 134 may monitor the pressure signals received from the load cell 124 and may identify from the signals the level of the pressure that is sensed by the load cell 124.

At operation 1006, the control circuit 134 receives second signals from the appliance 102 indicative of registering a press of the touchscreen 104. In an example, the control circuit 134 may receive the second signals from the appliance 102, such as via connection of the port 133 to a diagnostic connector of the appliance 102.

At operation 1008, the control circuit 134 records the pressure from the testing robot 108 that was sufficient to cause the appliance 102 to signal that the touchscreen 104 was pressed. At operation 1010, the pressure level may be provided as being the pressure threshold for the touchscreen 104. After operation 1010, the method 1000 ends.

Variations on the method 1000 may also be performed. In another example, the control circuit 134 may additionally or alternately determine the minimum pressure to cause release of a control from the touchscreen 104. For instance, beginning from a condition where the digital finger 106 is pressing the touchscreen 104, the control circuit 134 may instruct the testing robot 108 to remove the digital finger 106 from the touchscreen 104. The control circuit 134 may then receive first signals from the load cell 124 indicative of decreased pressure on the touchscreen 104 and second signals from the appliance 102 indicative of removal of the press of the touchscreen 104. The pressure from the load cells 124 when the response of the touchscreen 104 is recognized by the appliance 102 may accordingly be identified, which may differ from the initial pressure required to cause the touchscreen 104 to recognize the press. As another variation, the control circuit 134 may additionally or alternately perform such press and/or press release tests on different areas of the touchscreen 104. This may allow the control circuit 134 to map differences in the required pressure for different areas of the touchscreen 104.

Thus, the disclosed digital finger 106 and control circuit 134 may be used to validate the touchscreens 104 that are used by appliances 102 and other devices. The methods 900 and 1000 may be performed using the digital finger 106 to determine the pressing force and response time of the touchscreen 104. These measurements may be used to verify that the calibration values entered in the software for the appliance 102 the touches are correct, as well as to adjust the values if they are not correct. By calibrating the touchscreen 104, the operation of the appliance 102 may be calibrated to optimally register user touch input.

Figure 12:
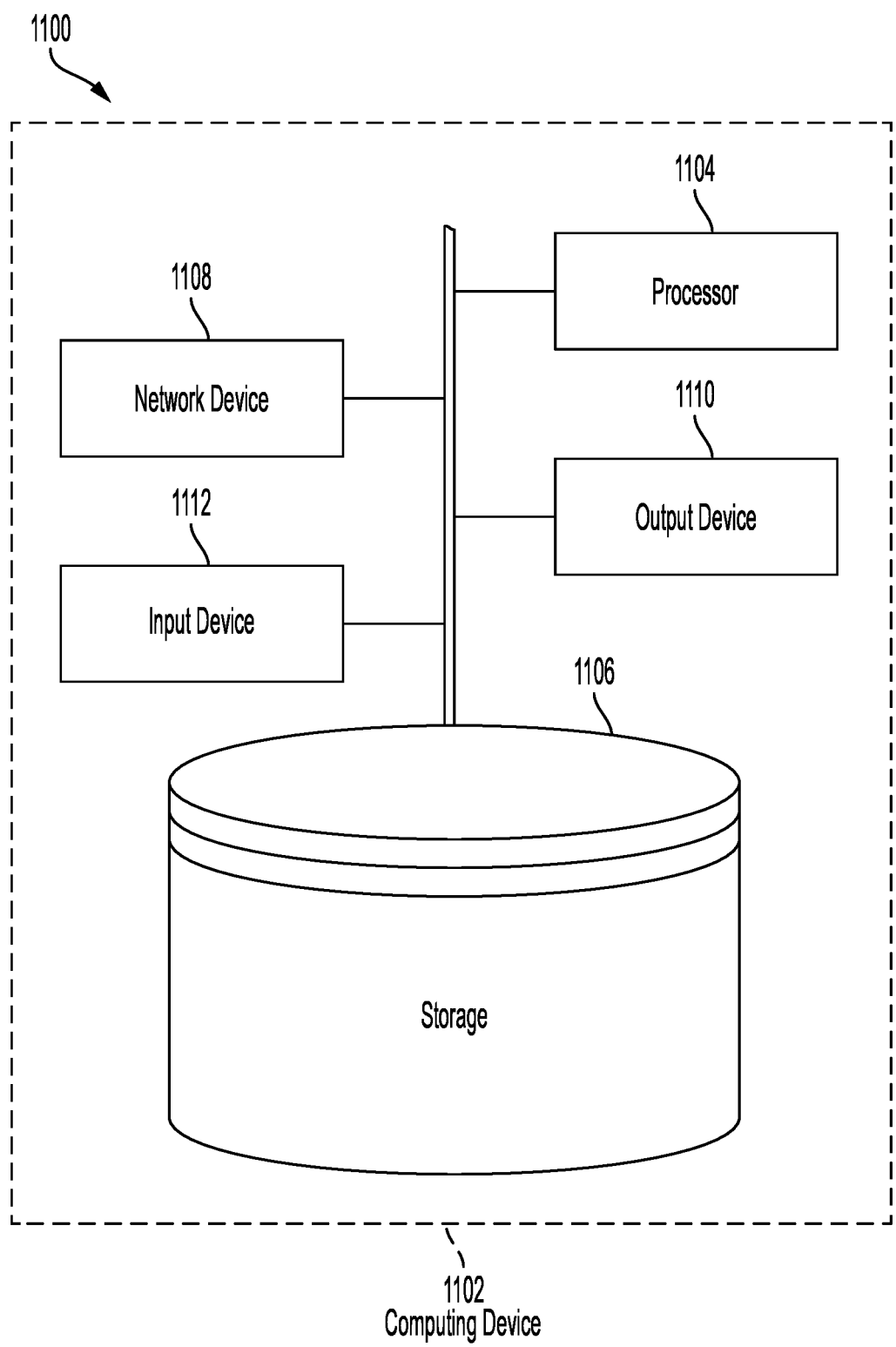
FIG. 12 illustrates an example computing device for performing aspects of the for automated testing of touch features.

FIG. 12 illustrates an example computing device 1102 for performing aspects of the automated testing of touch features. Referring to FIG. 12, and with reference to FIGS. 1-11, the appliance 102, the touchscreen 104, the testing robot 108, and the control circuit 134 may each include examples of such computing devices 1102. Computing devices 1102 generally include computer-executable instructions that are executable by one or more computing devices 1102. These computer-executable instructions may be compiled or interpreted from computer programs created using a variety of programming languages and/or technologies, including, without limitation, and either alone or in combination, Java™, C, C++, C #, Visual Basic, JavaScript, Python, JavaScript, Perl, etc. In general, a processor (e.g., a microprocessor) receives instructions, e.g., from a memory, a computer-readable medium, etc., and executes these instructions, thereby performing one or more processes such as the methods 900 and 1000, including one or more of the processes described herein. Such instructions and other data may be stored and transmitted using a variety of computer-readable media.

As shown, the computing device 1102 may include a processor 1104 that is operatively connected to a storage 1106, a network device 1108, an output device 1110, and an input device 1112. It should be noted that this is merely an example, and computing devices 1102 with more, fewer, or different components may be used.

The processor 1104 may include one or more integrated circuits that implement the functionality of a central processing unit (CPU) and/or graphics processing unit (GPU). In some examples, the processors 1104 are a system on a chip (SoC) that integrates the functionality of the CPU and GPU. The SoC may optionally include other components such as, for example, the storage 1106 and the network device 1108 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 1104 executes stored program instructions that are retrieved from the storage 1106. The stored program instructions, accordingly, include software that controls the operation of the processors 1104 to perform the operations described herein. The storage 1106 may include both non-volatile memory and volatile memory devices. The non-volatile memory includes solid-state memories, such as Not AND (NAND) flash memory, magnetic and optical storage media, or any other suitable data storage device that retains data when the system is deactivated or loses electrical power. The volatile memory includes static and dynamic random access memory (RAM) that stores program instructions and data during operation of the system 100.

The GPU may include hardware and software for display of at least two-dimensional (2D) and optionally three-dimensional (3D) graphics to the output device 1110. The output device 1110 may include a graphical or visual display device, such as an electronic display screen, projector, printer, or any other suitable device that reproduces a graphical display. As another example, the output device 1110 may include an audio device, such as a loudspeaker or headphone. As yet a further example, the output device 1110 may include a tactile device, such as a mechanically raiseable device that may, in an example, be configured to display braille or another physical output that may be touched to provide information to a user.

The input device 1112 may include any of various devices that enable the computing device 1102 to receive control input from users. Examples of suitable input devices 1112 that receive human interface inputs may include keyboards, mice, trackballs, touchscreens, microphones, graphics tablets, and the like.

The network devices 1108 may each include any of various devices that enable the described components to send and/or receive data from external devices over networks. Examples of suitable network devices 1108 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A digital finger for testing a touchscreen of an appliance using a testing robot, comprising:
   a finger holder configured to simulate interaction with the touchscreen;
   a load cell housing configured to hold a load cell, the load cell housing defining a channel for receiving the finger holder such that when the finger holder is pressed onto the touchscreen, the finger holder moves to increase pressure against the load cell;
   adjustment screws to adjust an initial linear location of the finger holder to press onto the load cell in an initial state; and
   a control circuit configured to:
      detect an unpressed pressure value when the finger holder is pressing the load cell in the initial state, and use the unpressed pressure value as a zero point to indicate that no force is being applied to the touchscreen,
      receive, from the load cell, first signals indicative of the pressure applied by the finger holder to the load cell based on the zero point,
      receive, from the appliance, second signals indicative of recognition of a touch to the touchscreen, and
      determine response time of the touchscreen and/or the pressure required to operate the touchscreen based on the first and second signals.

2. The digital finger of claim 1, wherein the control circuit is further configured to determine the response time as a difference in time between receipt of the first signals and receipt of the second signals.

3. The digital finger of claim 1, wherein the control circuit is further configured to determine the pressure required to operate the touchscreen as being the pressure recorded by the load cell at the time of receipt of the second signals.

4. The digital finger of claim 1, wherein the control circuit includes one or more switches configured to allow for selection of parameters to interface the digital finger to a device under test.

5. The digital finger of claim 1, wherein the control circuit includes one or more switches configured to allow for selection between a first mode of operation in which the response time of the touchscreen is measured, and a second mode of operation in which the pressure required to operate the touchscreen is measured by the digital finger.

6. The digital finger of claim 1, wherein the digital finger is attached as an end effector of an arm of the testing robot.

7. The digital finger of claim 6, wherein the control circuit is further configured to command the arm to move towards the touchscreen to apply the pressure to the touchscreen by the digital finger.

8. The digital finger of claim 6, wherein the load cell housing comprises an L-shaped connector having first and second legs serving as attachment points for insertion of the load cell housing into the testing robot as the end effector, the L-shaped connector being insertable into the testing robot in a first position where the finger holder is parallel to the end of the testing robot, and a second position where the finger holder is perpendicular to the testing robot.

9. The digital finger of claim 1, wherein the load cell housing defines two parallel spaced apart C-shaped legs that collectively define the channel configured for receiving the finger holder, and the finger holder defines slide portions extending laterally from opposite sides of the finger holder, the slide portions being sized in accordance with an inner profile of the channel such that the finger holder is free to slide inwards and outwards within the channel.

10. The digital finger of claim 9, further comprising one or more biasing members fitted within the channel between one or both of the slide portions and a back surface of the channel, the one or more biasing members configured to bias the finger holder outwards and away from the load cell.

11. The digital finger of claim 1, wherein the load cell housing further comprises a magnet configured to hold the load cell in position within the channel.

12. The digital finger of claim 1, further comprising a display to show the response time of the touchscreen and/or the pressure required to operate the touchscreen.

13. A method for using a digital finger for testing a touchscreen of an appliance using a testing robot, the method comprising:
adjusting screws to adjust an initial linear location of a finger holder to press onto a load cell in an initial state, the finger holder simulating interaction with the touchscreen, the load cell being held by a load cell housing defining a channel for receiving the finger holder, such that when the finger holder is pressed onto the touchscreen, the finger holder moves inwards and increases the pressure against the load cell;
detecting, by a control circuit, an unpressed pressure value when the finger holder is pressing the load cell in the initial state;
using the unpressed pressure value as a zero point to indicate that no force is being applied to the touchscreen;
receiving, from the load cell to the control circuit, first signals indicative of pressure applied by the finger holder simulating the interaction with the touchscreen based on the zero point;
receiving, from the appliance to the control circuit, second signals indicative of recognition of a touch to the touchscreen; and
determining, by the control circuit, response time of the touchscreen and/or the pressure required to operate the touchscreen based on the first and second signals.

14. The method of claim 13, further comprising determining, by the control circuit, the response time as a difference in time between receipt of the first signals and receipt of the second signals.

15. The method of claim 13, further comprising determining, by the control circuit, the pressure required to operate the touchscreen as being the pressure recorded by the load cell at the time of receipt of the second signals.

16. The method of claim 13, further comprising:
operating the control circuit in a first mode of operation in which the response time of the touchscreen is measured responsive to one or more switches of the control circuit being in a first position; and
operating the control circuit in a second mode of operation in which the pressure required to operate the touchscreen is measured by the digital finger responsive to the one or more switches of the control circuit being in a second position.

17. The method of claim 13, wherein the digital finger is attached as an end effector of an arm of the testing robot, and further comprising commanding the arm by the control circuit to move towards the touchscreen to apply the pressure to the touchscreen by the digital finger.

18. The method of claim 13, further comprising showing, on a display screen of the control circuit, the response time of the touchscreen and/or the pressure required to operate the touchscreen.

19. A digital finger for testing a touchscreen of an appliance using a testing robot, comprising:
a finger holder configured to simulate interaction with the touchscreen;
a load cell housing configured to hold a load cell, the load cell housing defining a channel for receiving the finger holder such that when the finger holder is pressed onto the touchscreen, the finger holder moves to increase pressure against the load cell, the load cell housing further including a magnet configured to hold the load cell in position within the channel; and
a control circuit configured to:
receive, from the load cell, first signals indicative of the pressure applied by the finger holder to the load cell,
receive, from the appliance, second signals indicative of recognition of a touch to the touchscreen, and
determine response time of the touchscreen and/or the pressure required to operate the touchscreen based on the first and second signals.

20. The digital finger of claim 19, wherein the control circuit is further configured to one or more of:
determine the response time as a difference in time between receipt of the first signals and receipt of the second signals; and/or
determine the pressure required to operate the touchscreen as being the pressure recorded by the load cell at the time of receipt of the second signals.

21. The digital finger of claim 19, wherein the control circuit includes one or more switches configured to allow for one or more of:
selection of parameters to interface the digital finger to a device under test; and/or
selection between a first mode of operation in which the response time of the touchscreen is measured, and a second mode of operation in which the pressure required to operate the touchscreen is measured by the digital finger.

22. The digital finger of claim 19, wherein the digital finger is attached as an end effector of an arm of the testing robot, and the control circuit is further configured to command the arm to move towards the touchscreen to apply the pressure to the touchscreen by the digital finger.

23. The digital finger of claim 22, wherein the load cell housing comprises an L-shaped connector having first and second legs serving as attachment points for insertion of the load cell housing into the testing robot as the end effector, the L-shaped connector being insertable into the testing robot in a first position where the finger holder is parallel to the end of the testing robot, and a second position where the finger holder is perpendicular to the testing robot.

24. The digital finger of claim 19, wherein the load cell housing defines two parallel spaced apart C-shaped legs that collectively define the channel configured for receiving the finger holder, and the finger holder defines slide portions extending laterally from opposite sides of the finger holder, the slide portions being sized in accordance with an inner profile of the channel such that the finger holder is free to slide inwards and outwards within the channel.

25. The digital finger of claim 24, further comprising one or more biasing members fitted within the channel between one or both of the slide portions and a back surface of the channel, the one or more biasing members configured to bias the finger holder outwards and away from the load cell.

26. The digital finger of claim 19, further comprising a display to show the response time of the touchscreen and/or the pressure required to operate the touchscreen.

27. A digital finger for testing a touchscreen of an appliance using a testing robot, comprising:
  a finger holder configured to simulate interaction with the touchscreen;
  a load cell housing configured to hold a load cell, the load cell housing defining a channel for receiving the finger holder such that when the finger holder is pressed onto the touchscreen, the finger holder moves to increase pressure against the load cell, the load cell housing further defining an L-shaped connector having first and second legs serving as attachment points for insertion of the load cell housing into the testing robot as an end effector, the L-shaped connector being insertable into the testing robot in a first position where the finger holder is parallel to the end of the testing robot, and a second position where the finger holder is perpendicular to the testing robot; and
  a control circuit configured to:
    receive, from the load cell, first signals indicative of the pressure applied by the finger holder to the load cell,
    receive, from the appliance, second signals indicative of recognition of a touch to the touchscreen, and
    determine response time of the touchscreen and/or the pressure required to operate the touchscreen based on the first and second signals.

28. The digital finger of claim 27, wherein the control circuit is further configured to one or more of:
  determine the response time as a difference in time between receipt of the first signals and receipt of the second signals; and/or
  determine the pressure required to operate the touchscreen as being the pressure recorded by the load cell at the time of receipt of the second signals.

29. The digital finger of claim 27, wherein the control circuit includes one or more switches configured to allow for:
  selection of parameters to interface the digital finger to a device under test; and/or
  selection between a first mode of operation in which the response time of the touchscreen is measured, and a second mode of operation in which the pressure required to operate the touchscreen is measured by the digital finger.

30. The digital finger of claim 27, wherein the digital finger is attached as an end effector of an arm of the testing robot, and the control circuit is further configured to command the arm to move towards the touchscreen to apply the pressure to the touchscreen by the digital finger.

31. The digital finger of claim 27, wherein the load cell housing defines two parallel spaced apart C-shaped legs that collectively define the channel configured for receiving the finger holder, and the finger holder defines slide portions extending laterally from opposite sides of the finger holder, the slide portions being sized in accordance with an inner profile of the channel such that the finger holder is free to slide inwards and outwards within the channel.

32. The digital finger of claim 31, further comprising one or more biasing members fitted within the channel between one or both of the slide portions and a back surface of the channel, the one or more biasing members configured to bias the finger holder outwards and away from the load cell.

33. The digital finger of claim 27, further comprising a display to show the response time of the touchscreen and/or the pressure required to operate the touchscreen.

* * * * *